(12) United States Patent
Goodwin et al.

(10) Patent No.: US 11,537,446 B2
(45) Date of Patent: Dec. 27, 2022

(54) ORCHESTRATION AND SCHEDULING OF SERVICES

(71) Applicant: Microsoft Technology Licensing, LLC, Redmond, WA (US)

(72) Inventors: Robert Lovejoy Goodwin, Mercer Island, WA (US); Janaina Barreiro Gambaro Bueno, Redmond, WA (US); Sitaramaswamy V. Lanka, Mercer Island, WA (US); Javier Garcia Flynn, Perth (AU); Pedram Faghihi Rezaei, Seattle, WA (US); Karthik Pattabiraman, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 365 days.

(21) Appl. No.: 16/540,896

(22) Filed: Aug. 14, 2019

(65) Prior Publication Data

US 2021/0049050 A1 Feb. 18, 2021

(51) Int. Cl.
*G06F 9/50* (2006.01)
*G06N 20/00* (2019.01)
*G06F 9/48* (2006.01)
*G06F 17/18* (2006.01)

(52) U.S. Cl.
CPC .......... *G06F 9/5088* (2013.01); *G06F 9/4881* (2013.01); *G06F 17/18* (2013.01); *G06N 20/00* (2019.01)

(58) Field of Classification Search
None
See application file for complete search history.

(56) References Cited

U.S. PATENT DOCUMENTS

| 6,549,930 B1* | 4/2003 | Chrysos ................ G06F 9/4881 718/104 |
| 8,620,921 B1* | 12/2013 | Susarla .................. G06F 16/28 707/738 |
| 9,720,732 B1 | 8/2017 | Shih et al. |
| 10,078,510 B1* | 9/2018 | Powers ..................... G06F 8/71 |
| 10,152,349 B1* | 12/2018 | Anand .................. G06N 5/003 |
| 10,599,478 B1* | 3/2020 | Ghare ....................... G06F 9/50 |
| 10,853,148 B1* | 12/2020 | Kenney ................ G06F 9/4881 |

(Continued)

FOREIGN PATENT DOCUMENTS

EP 0225918 A1 6/1987

OTHER PUBLICATIONS

"Non-Final Office Action Issued in U.S. Appl. No. 16/457,323", dated Apr. 29, 2021, 17 Pages.

(Continued)

*Primary Examiner* — Meng Ai T An
*Assistant Examiner* — Zujia Xu
(74) *Attorney, Agent, or Firm* — Rainier Patents, P.S.

(57) ABSTRACT

This document relates to orchestration and scheduling of services. One example method involves obtaining dependency information for an application. The dependency information can represent data dependencies between individual services of the application. The example method can also involve identifying runtime characteristics of the individual services and performing automated orchestration of the individual services into one or more application processes based at least on the dependency information and the runtime characteristics.

24 Claims, 12 Drawing Sheets

(56) References Cited

U.S. PATENT DOCUMENTS

| | | |
|---|---|---|
| 2003/0149717 A1 | 8/2003 | Heinzman |
| 2007/0074217 A1* | 3/2007 | Rakvic ............... G06F 9/3851 718/102 |
| 2009/0241117 A1 | 9/2009 | Dasgupta et al. |
| 2011/0321051 A1 | 12/2011 | Rastogi |
| 2012/0131139 A1* | 5/2012 | Siripurapu ............. H04L 65/60 709/217 |
| 2012/0174112 A1* | 7/2012 | Vaidya ................ G06F 9/4856 718/104 |
| 2013/0024849 A1 | 1/2013 | Baba |
| 2013/0055275 A1* | 2/2013 | Comeau ............ H04W 72/1257 718/103 |
| 2014/0089393 A1* | 3/2014 | Druet .................... H04L 67/34 709/203 |
| 2014/0325495 A1* | 10/2014 | Ravi ...................... G06F 8/452 717/150 |
| 2015/0331681 A1 | 11/2015 | Rose et al. |
| 2015/0350967 A1* | 12/2015 | Gustafsson ....... H04W 36/0033 455/438 |
| 2016/0110175 A1 | 4/2016 | Fink et al. |
| 2016/0147575 A1* | 5/2016 | Singh ................... G06F 9/5088 718/105 |
| 2016/0291942 A1 | 10/2016 | Hutchison |
| 2017/0250890 A1 | 8/2017 | Puls et al. |
| 2017/0255515 A1* | 9/2017 | Kim ....................... G06F 3/065 |
| 2017/0257429 A1* | 9/2017 | Hosie .................. H04L 67/101 |
| 2018/0024851 A1 | 1/2018 | Barker et al. |
| 2018/0121235 A1* | 5/2018 | Saballus ............... G06F 9/4881 |
| 2019/0042523 A1* | 2/2019 | Ismail ................. G06F 13/385 |
| 2019/0065241 A1 | 2/2019 | Wong et al. |
| 2019/0196805 A1* | 6/2019 | Lee ...................... H04L 41/082 |
| 2020/0257539 A1* | 8/2020 | Borlick ................. G06N 20/00 |
| 2020/0322431 A1* | 10/2020 | Danilov ................. H04L 67/10 |
| 2020/0409673 A1 | 12/2020 | Goodwin et al. |

OTHER PUBLICATIONS

Eichberg, et al., "Lattice Based Modularization of Static Analyses", In Proceedings of the ISSTA Companion/ECOOP Companion, Jul. 16, 2018, 6 Pages.

"International Search Report and Written Opinion Issued in PCT Application No. PCT/US20/032539", dated Aug. 5, 2020, 8 Pages.

"International Search Report and Written Opinion Issued in PCT Application No. PCT/US20/037101", dated Sep. 29, 2020, 15 Pages.

"Final Office Action Issued In U.S. Appl. No. 16/457,323", dated Nov. 15, 2021, 22 Pages.

"Non Final Office Action Issued in U.S. Appl. No. 16/457,323", dated Apr. 29, 2022, 25 Pages.

U.S. Appl. No. 16/457,323, filed Jun. 28, 2019.

"Office Action Issued in European Patent Application No. 20729904. 1", dated Sep. 8, 2022, 3 Pages.

* cited by examiner

ORCHESTRATION AND SCHEDULING OF SERVICES

BACKGROUND

In many cases, software applications are expected to exhibit low-latency processing. For instance, a cloud application might be expected to respond to a user query within 500 milliseconds. Meeting these latency expectations becomes more difficult as applications grow more complex.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for orchestration and/or scheduling of services. One example includes a method or technique that can be performed on a computing device. The method or technique can include obtaining dependency information for an application. The dependency information can represent data dependencies between individual services of the application. The example method or technique can also include identifying runtime characteristics of the individual services and performing automated orchestration of the individual services into one or more application processes based at least on the dependency information and the runtime characteristics.

Another example includes a method or technique that can be performed on a computing device. The method or technique can include evaluating execution logs for an application having a plurality of services to identify different critical paths corresponding to multiple executions of the application. The method or technique can also include identifying a statistical critical path for the application based at least on frequency of occurrence of the different critical paths in the execution logs and scheduling individual services of the application based at least on whether the individual service occur on the statistical critical path.

Another example includes a system having a first computing cluster configured to execute a first application process, a second computing cluster configured to execute a second application process, and a computing device configured to execute an orchestrator. The orchestrator can be configured to obtain dependency information reflecting dependencies between a plurality of services of an application and obtain runtime information representing runtime characteristics of individual services. The orchestrator can also be configured to perform orchestration of the individual services into the first process on the first computing cluster and the second process on the second computing cluster based at least on the dependency information and the runtime characteristics.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
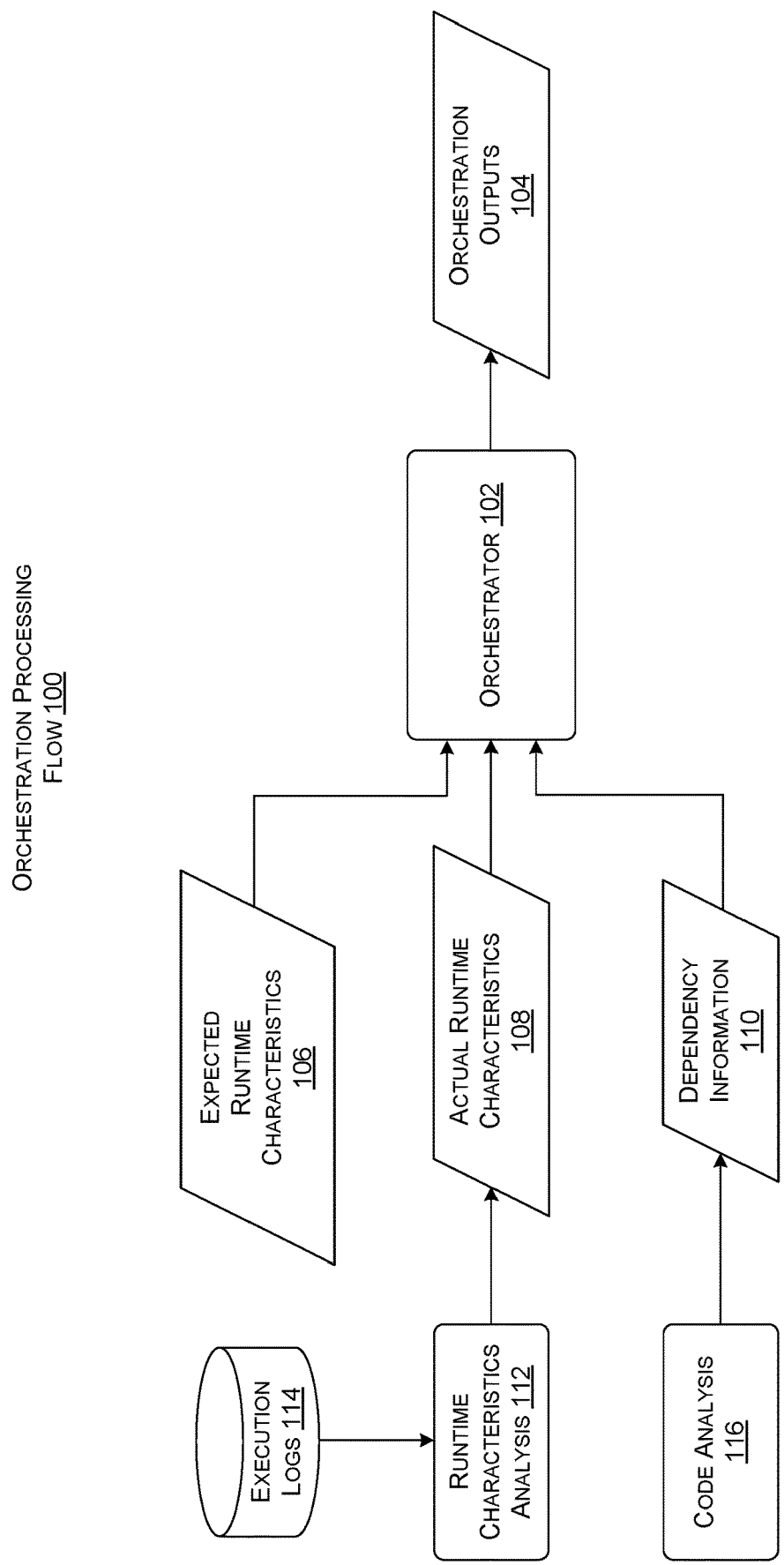
FIG. 1 illustrates an example processing flow for orchestrating an application, consistent with some implementations of the present concepts.

As noted, many software applications strive to achieve low latency. For instance, a search application in the cloud might be expected to respond to user queries received over a network in a short amount of time, e.g., 500 milliseconds. As another example, a multi-user video game in the cloud might be expected to process controller inputs within a short period of time, e.g., 10 milliseconds.

However, writing low-latency code can be difficult. Generally, software developers find it easier to write modularized code that is self-contained, e.g., lacks complex data dependencies on other code modules. One approach that allows developers to write modularized code involves writing and deploying code modules as independent services that execute in separate processes, potentially on separate machines. Writing code using a service-based approach with code modules that lack dependencies on one another is a very scalable and agile approach. However, when the services are deployed on different machines, network and serialization costs can impact latency. Even if the services are deployed in different processes on the same machine, serialization costs still can affect latency. Moreover, while network costs have trended downward, serialization costs are relatively stable.

One approach to developing low-latency software while enabling developers to write independent services is to deploy all of the services of a particular application into the same process on the same machine. Because the services are on the same machine, there is no network cost, and because the services are in the same process, there is no serialization cost. This approach works to a point, but there are limitations on how many services can be deployed on a single machine.

For example, in some cases, an application simply grows too large for a single machine—the services for that application use more resources than the machine can physically provide. In other cases, the machine theoretically has sufficient resources to accommodate the entire application, but at runtime the services compete for resources in a manner that causes inefficient resource usage. In some cases, the resource competition on a given machine can have a higher cost than the network/serialization costs that would be incurred by moving one of those services to another machine to alleviate the resource competition.

One approach to addressing the above-mentioned issues is to manually orchestrate and schedule services. Orchestration refers to determining where code runs, e.g., whether individual services are deployed on the same machine or in different machines, in the same process or in separate processes, etc. Scheduling refers to determining when code runs, e.g., whether services can be run in anticipation and/or run in parallel, as well as runtime prioritization of one service relative to another, etc.

Developers generally have insights into their services that can be helpful for scheduling and orchestration purposes. However, it would be preferable to allow developers to focus on writing individual services without having to spend time making orchestration and scheduling decisions, as this may require contemplating the complex interaction between services. Moreover, developers ideally want to be able to deploy their code autonomously, by shipping services when they are ready, rather than having to spend time integrating their code with other services for optimization of orchestration and scheduling. When developers write code with orchestration and performance concerns in mind, they tend to write code that is more difficult to understand and maintain.

An alternative approach to manual scheduling and orchestration would be to perform automated analysis of source code in advance of scheduling and orchestration to infer resource usage patterns and schedule/orchestrate the services accordingly. However, it is not always feasible to anticipate ahead of time how code will act when deployed. For example, different use cases for software can result in different resource usage patterns that may not be apparent via source inspection.

The disclosed implementations generally aim to address the above deficiencies of conventional approaches to deploying application services. For example, the disclosed implementations provide orchestration mechanisms that can assign different services to different processes and/or different machines in view of various criteria, such as latency, reliability, and financial cost. The disclosed implementations also provide scheduling mechanisms that schedule individual services in view of runtime characteristics of those services. In some cases, dependency relationships between individual services can be used to inform orchestration and/or scheduling decisions.

Definitions

For the purposes of this document, the term "application process" refers to application code, memory allocated to execute the application code, and state associated with the application process. An application process can have one or more threads, each of which can share the same memory allocated to the process. For instance, in some cases, an application process can be allocated a designated virtual memory space by an operating system or hypervisor, and each thread in the application process can share that virtual memory space. The term "thread" refers to a sequence of instructions that can be scheduled independently at runtime.

At runtime, different services can be allocated one or more threads within a given process. When two or more services are concurrently executing in different threads, the services can be considered to run in parallel. In some cases, different threads can run on different processors, and in other cases, a single processor can execute multiple threads concurrently. The term "service" refers to a software module that can be deployed independently and interact with other services in a modular fashion. Generally speaking, services can have characteristics of functional code, i.e., services tend to lack complex data dependencies on other services. Because individual services lack complex data dependencies on other services, it is plausible to add, remove, or replace individual services within a given application without introducing logical errors or causing the application to crash.

The term "dependency graph" refers to a graph that represents data as nodes and services as edges. The term "edge" identifies both a service and a place in a dependency graph where the service can be run without violating any dependencies between that service and other services. Generally, dependency graphs can be obtained by static or dynamic analysis of an application. One type of a dependency graph is an execution graph, which represents dependencies over a single execution of an application.

Dependency graphs can be used to ensure that the inputs to a service do not change after the service begins processing. When this is true, then services can have the characteristics of functional code described above, which provides significant flexibility for orchestration and scheduling purposes. If an input to a service changes at runtime after that service begins processing, this can create a cycle in the dependency graph. Thus, one broad approach for orchestration and scheduling involves representing relationships between services as a directed acyclic graph, and then orchestrating and scheduling those services consistently with the dependencies conveyed by the directed acyclic graph.

Example Orchestration Processing Flow

As noted previously, orchestration generally refers to determining where code will run, e.g., by assigning individual services to run on a specific process and/or on a specific machine. FIG. 1 illustrates an example orchestration processing flow 100, consistent with the disclosed implementations. In the orchestration processing flow, an orchestrator 102 generates orchestration outputs 104 based on various inputs. For instance, the orchestration outputs can include process assignments that assign individual services to individual processes. In some cases, the orchestration outputs also designate a particular computer or cluster of computers to run respective instances of the processes.

To determine the orchestration outputs 104, the orchestrator 102 can consider various sources of input data. For instance, the orchestrator can consider expected runtime characteristics 106, actual runtime characteristics 108, and/or dependency information 110. Details on how the orchestrator can use these inputs to determine the orchestration outputs are described below with reference to FIGS. 2-7.

One way to obtain expected runtime characteristics 106 for a service is via a developer hint. Generally, a developer hint can include information about a given service provided by a developer of that service, e.g., an expected resource usage characteristic and/or runtime duration of that service. In some implementations, a developer hint can be provided up-front by a developer before a given service is ever run. For instance, a service may have one or more associated attributes provided by the developer at development time. Thus, developer hints can be used for orchestration purposes prior to actually running a given service. More generally, the term "expected runtime characteristics" encompasses any type of information, aside from information derived from execution logs, that conveys information about how a service is expected to behave at runtime.

Actual runtime characteristics 108 can be derived by employing runtime characteristics analysis 112 on one or more execution logs 114. Generally, the execution logs can reflect previous executions of a given application. The actual runtime characteristics derived from the execution logs can reflect information about resource usage, runtime duration (latency), and/or network and serialization costs of individual services that is collected over time. In some cases, any of the actual runtime characteristics provided in the execution logs can vary significantly over time, e.g., in different executions of the application.

Dependency information 110 can include information that reflects data dependencies between individual services of the application, e.g., in the form of a dependency graph. Generally, the dependency information can be derived by employing code analysis 116 on source code for individual services and/or by evaluating interactions between individual services at runtime. For instance, source code can be analyzed by recursively analyzing calls in the source code to determine which services invoke other services at runtime. Alternatively, or in addition, runtime evaluation of executable code can be performed to determine dependencies based on which services invoke other services at runtime.

Orchestration Example

Figure 2:
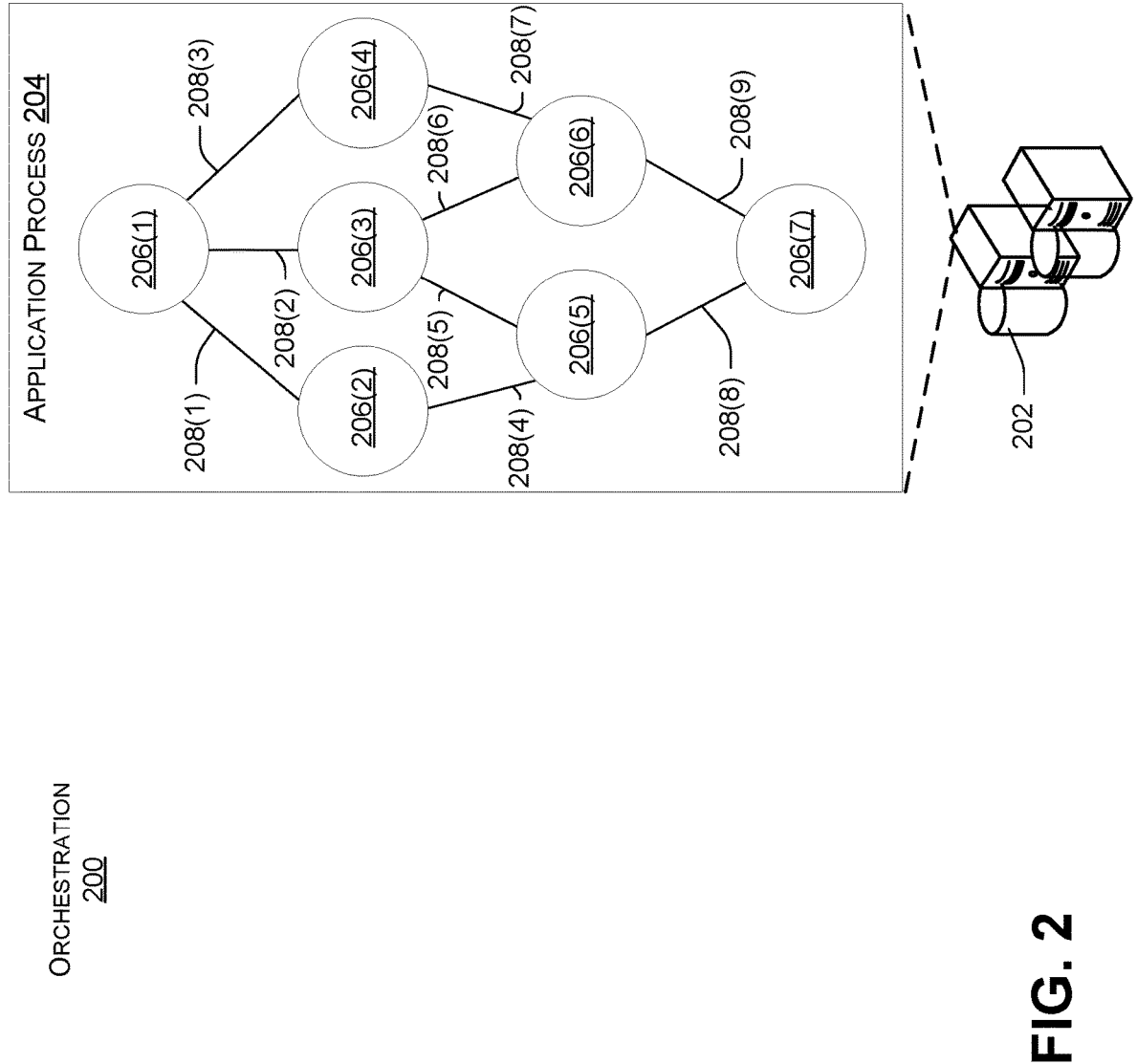
FIGS. 2 and 3 illustrate example orchestrations of an application, consistent with some implementations of the present concepts.

FIG. 2 illustrates an example orchestration 200 of services. A computing cluster 202 runs an application process 204. In this example, an entire application is run within a single application process. Within the application process, various calls between services are represented as a dependency graph with nodes 206(1) through 206(7) representing data and edges 208(1) through 208(9) representing services. Thus, the dependency graph shown in FIG. 2 represents the application in a form that implicitly conveys dependency information about dependencies between a service represented by edge 208(7) and other services represented by other edges in the application. As noted above, in some cases such a dependency graph can be generated at compile time and in other cases at runtime. To ensure programmatic correctness, the edges of the dependency graph can be orchestrated and scheduled to ensure that the dependencies are honored.

In addition, note that that application process 204 can be duplicated over one or more servers of computing cluster 202, e.g., each server can run a separate instance of application process 204. For simplicity of exposition, the following examples assume that each server in the computing cluster has identical hardware and software resources. However, the disclosed implementations can also be employed in heterogenous processing environments where a given computing cluster may have machines with different resource constraints.

Figure 3:
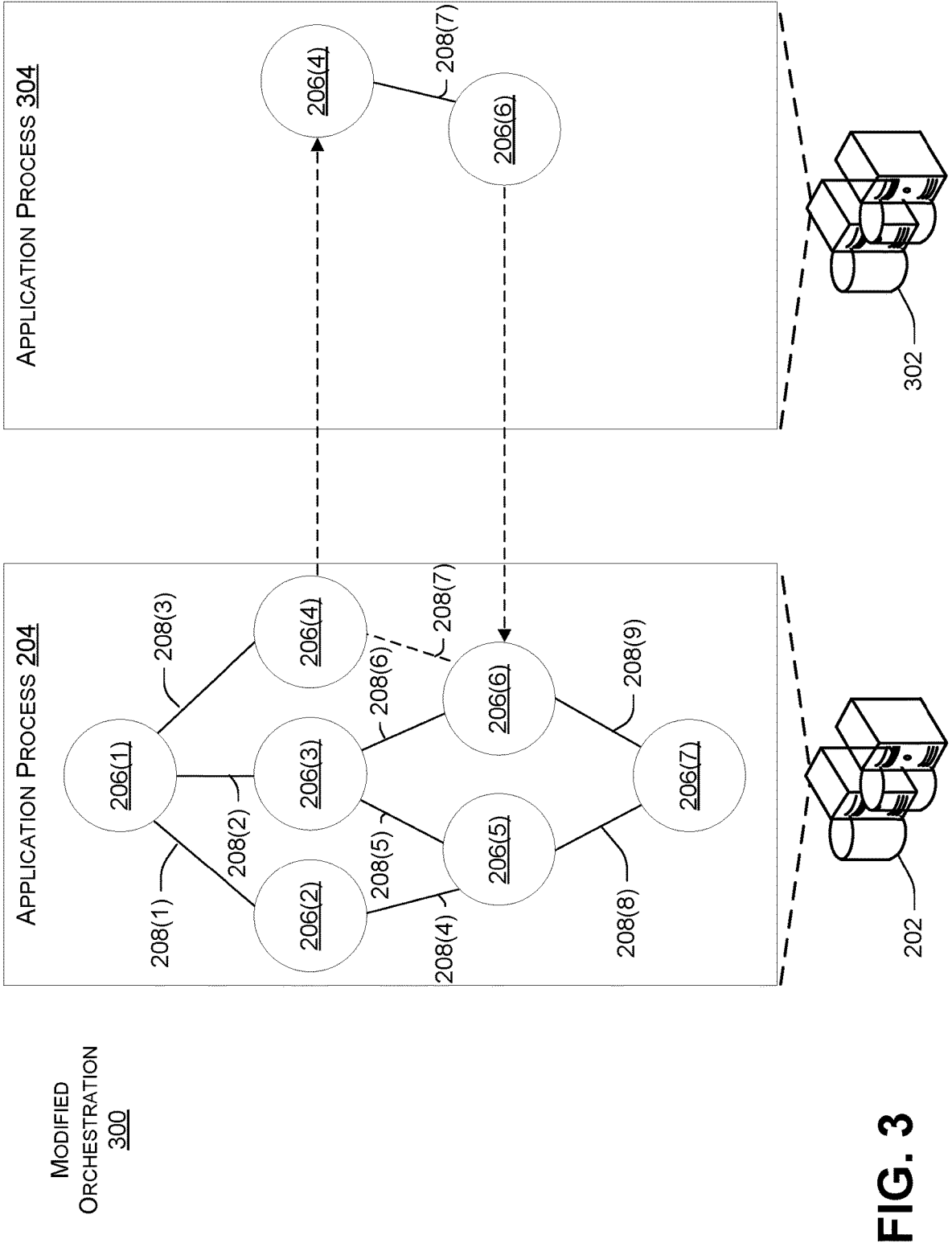

FIG. 3 illustrates an example of a modified orchestration 300 of the application. Here, part of the application is moved to another computing cluster 302, which runs another application process 304. Specifically, edge 208(7) has been moved from application process 204 on computing cluster 202 to application process 304 on computing cluster 302. At runtime, application process 204 can communicate node 206(4) to application process 304 using an inter-process communication mechanism such as a network transfer, for use as an input to edge 208(7). Application process 304 executes edge 208(7) on input node 206(4) to obtain output node 206(6), and then communicates output node 206(6) back to application process 204 for further processing via another network transfer.

Generally, FIGS. 4-7 describe individual scenarios where orchestrator 102 might modify the orchestration 200 shown in FIG. 2 to arrive at modified orchestration 300 shown in FIG. 3. Note that FIGS. 4-7 illustrate relatively simple examples to convey certain orchestration considerations in isolation. The following section entitled "ORCHESTRATION CONSIDERATIONS" provides more detail on how orchestration can be performed in more complex scenarios.

Orchestration Based on Resource Contention

Figure 4:
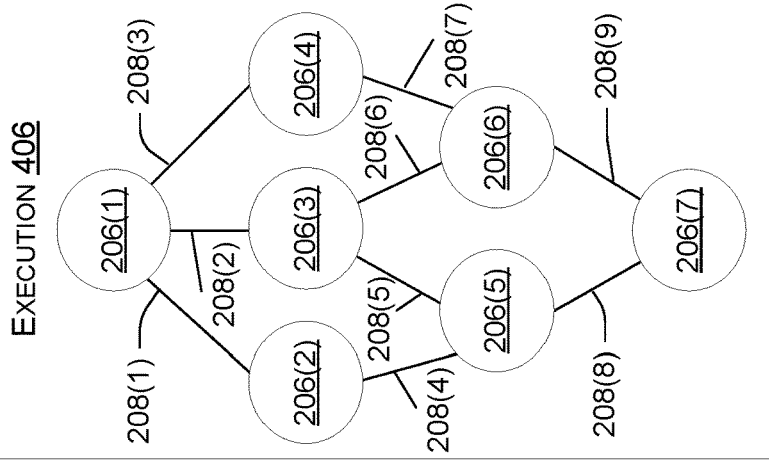
FIGS. 4-6 illustrate examples of execution instances of an application, consistent with some implementations of the present concepts.
Figure 4:
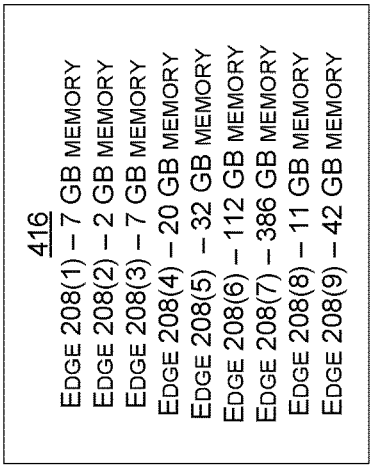
Figure 4:
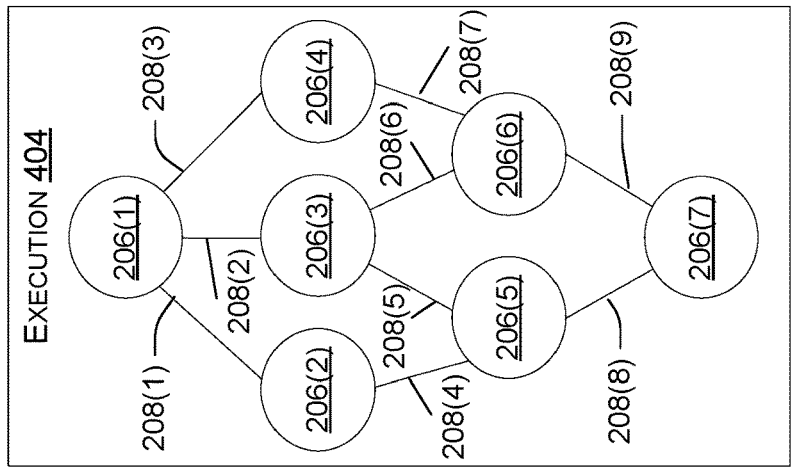
Figure 4:
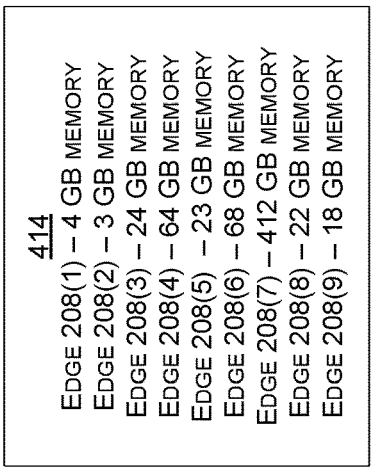
Figure 4:
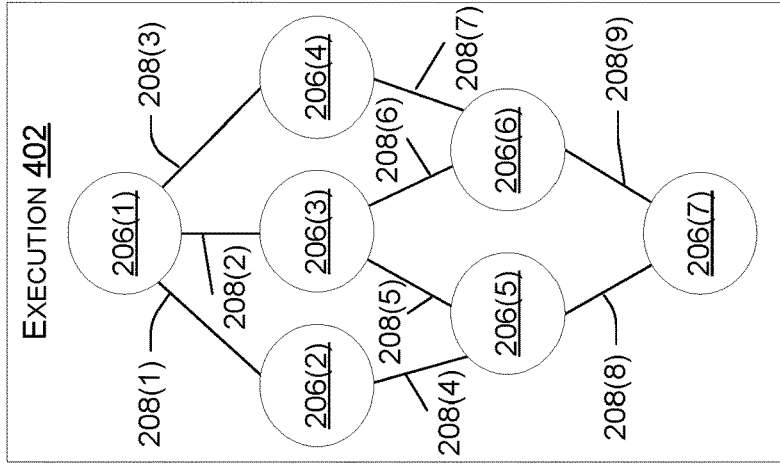
Figure 4:
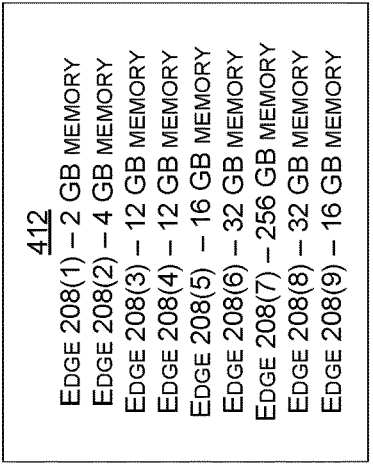

FIG. 4 illustrates an example of how actual runtime characteristics 108 obtained from execution logs 114 can be used with dependency information 110 for orchestration purposes. Assume that the application has processed three queries when orchestrated in a single application process as shown in FIG. 2. FIG. 4 illustrates three executions, execution 402, execution 404, and execution 406, each represented by a corresponding execution graph. Each execution has a corresponding instance of working memory utilization, 412, 414, and 416, obtained from execution logs 114.

Note than an "execution" can refer to processing an input to obtain an output, and each execution may involve running the same process on different instances of input data. Thus, the representations shown in FIG. 4 show how much working memory was used by different edges in different executions. This data can be collected from a single instance of a process running on a single machine or from multiple instances of the process running on different machines.

In this example, edge 208(7) exhibits significantly more working memory utilization than any other edge. In a circumstance where the machines in computing cluster 202 are close to running out of memory, it may be useful to switch to the modified orchestration 300 by moving edge 208(7) over to computing cluster 302. By doing so, a significant amount of memory can be freed by moving only a single service from one process to another.

Note, however, that this decision can be based on additional criteria such as the serialization cost and network cost of moving edge 208(7) in view of input and output dependencies shown in FIG. 4. Specifically, moving edge 208(7) to computing cluster 302 will involve serialization and network costs for both nodes 206(4) and 206(6), because edge 208(7) has a data dependency on node 206(4) and edge 208(9) has a data dependency on node 206(6). In other words, the output data of edge 208(3) is node 206(4), and this output data will be serialized on computing cluster 202 and sent over a network to computing cluster 302 for processing by edge 208(7). This will take a certain amount of time. Likewise, the output data of edge 208(7) is node 206(6). This output data will be serialized on computing cluster 302 and sent over the network to computing cluster 202 for processing by edge 208(9). In some cases, the latency cost imposed by the network and serialization of this data can exceed the benefit obtained by freeing up memory. The "ORCHESTRATION CONSIDERATIONS" set forth below describes various approaches that can be used to consider network and serialization costs of candidate orchestrations versus the potential performance benefits of orchestrating services on separate machines/processes.

As another example of how actual runtime characteristics can inform orchestration decisions, assume that each edge each use 8 threads, and each physical machine in computing cluster 202 provides a total of 24 threads. Thus, no more than three edges can be run concurrently without running out of threads. Generally, the disclosed implementations can determine whether the serialization and network costs of moving one or more edges to another process will result in lower average latency than keeping those edges in the same process and accepting the cost of thread contention.

Considering the dependencies conveyed in FIG. 4, note that edges 208(4), 208(5), 208(6), and 208(7) have no data dependencies on one another. Thus, it is plausible that these edges can be run in parallel on a given machine. However, collectively, these edges utilize a total of 32 threads. Thus, some implementations may choose of these edges to move to computing cluster 302. For instance, one approach is to choose the service with the lowest serialization and network cost and compare those costs to the expected latency impact of thread contention. Assuming edge 208(7) has the lowest serialization and network cost of these four edges and that the serialization and network cost is below the thread contention cost (e.g., latency hit) of keeping the edge on the same computing cluster as the other edges, then edge 208(7) can be moved to computing cluster 302 as shown in FIG. 3.

In other implementations, edges can be orchestrated based on other types of resource utilization, such as network usage, storage throughput, and/or storage capacity utilization. In the case of network utilization, some services may utilize a network resource such as a network card very heavily and cause other services to block or sleep while waiting to access the network resource. When this occurs, latency can potentially be reduced by moving that service (or another service) to another process/machine, subject to consideration of the network and serialization costs of doing so. Storage throughput is similar, e.g., if one service exhibits heavy utilization of the storage bus, this can slow down other services that also access storage and orchestrating one or more services to another machine may result in a net latency improvement even after the network and serialization costs are considered. Storage capacity utilization can be viewed as a more static consideration, e.g., whenever storage starts to become full, one or more services can be selected to orchestrate on a different machine.

Orchestration Based on Execution Frequency

Figure 5:
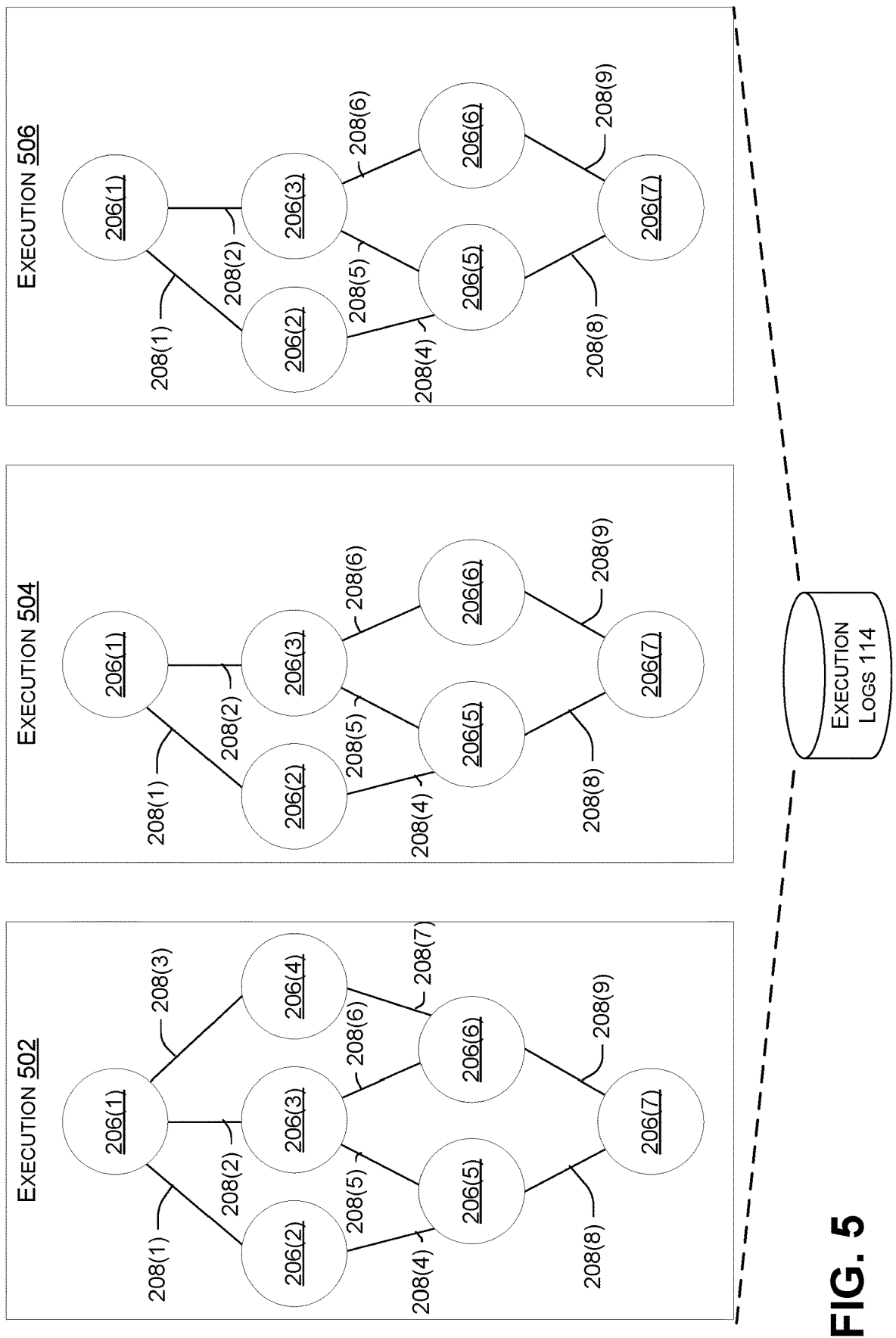

FIG. 5 illustrates another example of how actual runtime characteristics obtained from the execution logs can be used for orchestration purposes. FIG. 5 illustrates three executions, execution 502, execution 504, and execution 506. In this example, the execution graphs of the individual executions are not all identical—the execution graph of execution 502 invokes all edges of the application, but the second two executions 504 and 506 have execution graphs that do not invoke edge 208(3) and edge 208(7). FIG. 5 illustrates the concept that some services may run less frequently than other services. In general, it can be useful to orchestrate edges that run less frequently into separate processes, particularly for services that utilize resources even when they are not executed. Assume in this example that edge 208(3) has an extremely high serialization cost, whereas edge 208(7) does not. Thus, in this particular case, it can be useful to orchestrate edge 208(7) into application process 304 on computing cluster 302, while retaining edge 208(3) in application process 204 on computing cluster 202.

Note that services that run less frequently may be placed into clusters with relatively fewer computers. For instance, if there are 10,000 computers in a main cluster and a given service only runs on a small fraction of the executions of the application, that service might be put into a separate process that is executed on a much smaller cluster, e.g., 200 machines. Note also that execution frequency can change over time, e.g., if edge 208(7) starts to become invoked more frequently in the future, edge 208(7) could be moved back to application process 204 on computing cluster 202, potentially while moving another edge over to application process 304 on computing cluster 302.

Orchestration Based on Statistical Critical Path

Figure 6:
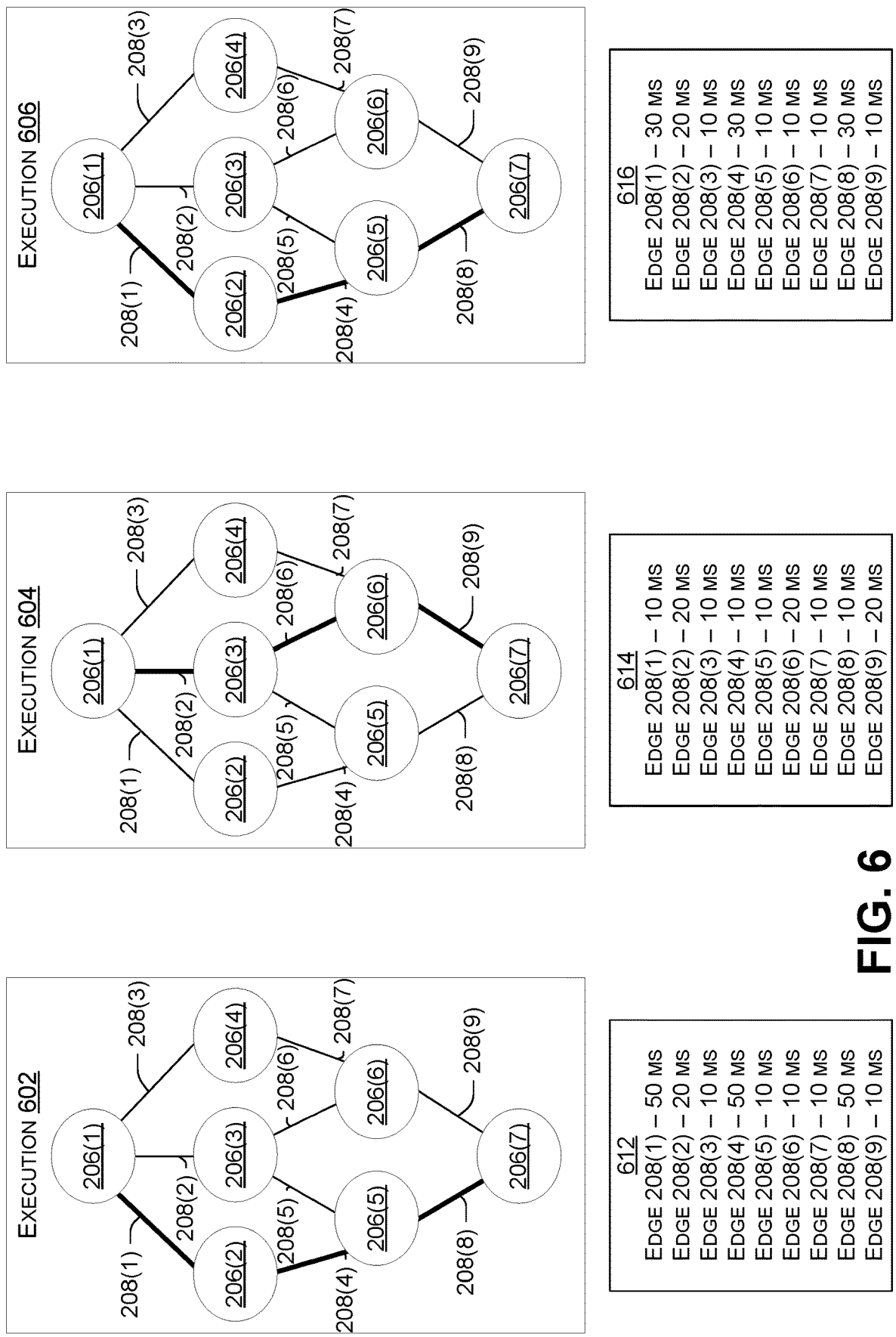

FIG. 6 illustrates another example of how actual runtime characteristics obtained from the execution logs can be used with dependency information for orchestration purposes. FIG. 6 illustrates three executions, execution 602, execution 604, and execution 606. Each execution has corresponding edge runtimes 612, 614, and 616, obtained from execution logs 114.

Generally, the critical path through an application is the path that determines the overall latency for that application. In some applications, the critical path may always go through the same edges and nodes, but this is not always the case. In FIG. 6, the critical path for each individual execution is shown in bold. Note that the critical path for execution 504 is different than the critical path for executions 602 and 606.

Generally, it can be useful to keep edges in the critical path in the same process so that those edges do not incur serialization/network costs. Here, note that edges 208(3) and 208(7) are never in the critical path. Thus, these edges could be good candidates for orchestration in a separate process. Assume again that edge 208(3) has an extremely high serialization cost, whereas edge 208(7) does not. Thus, in this particular case, it can be useful to orchestrate edge 208(7) into application process 304 while retaining edge 208(3) in application process 204.

In some cases, it may be necessary or useful to orchestrate edges that sometimes appear in the critical path into another process. Generally, the less often an edge appears in the critical path, the more likely that overall performance can be maintained even if that edge is moved to another process. Thus, consider edge 208(6), for instance. This edge is in the critical path once. Thus, all other things being equal, it is likely preferable to orchestrate edge 208(6) into a separate process or machine rather than edges 208(1), 208(4), and 208(8), which appear in the critical path more frequently.

While FIG. 6 illustrates three example executions, in practice, there may be a very large number of executions stored in the execution logs. Statistical analysis may be performed over the execution logs to determine the "statistical critical path," e.g., a path that is the critical path in more executions of the application than any other path. Another approach to identifying the statistical critical path is to consider only those executions where an SLA-specified latency is exceeded, and identify the most-frequently occurring critical path in those executions. Generally, it can be useful to ensure that edges on the statistical critical path all run in the same process/machine when possible.

In some cases, the remaining edges that are not on the statistical critical path can be evaluated using a distance metric. The distance from the critical path can be defined for a given edge as the amount of additional time that edge would have had to run in a given execution before appearing on the critical path. Thus, for instance, consider execution 602. The critical path is 150 milliseconds, i.e., 50 milliseconds each for edges 208(1), 208(4), and 208(8). Edge 208(2) took 20 milliseconds, and in this execution was in a path through edges 208(5) and 208(8) that took 80 milliseconds total. Thus, edge 208(2) has a distance of 70 milliseconds from the critical path in this instance. Edge 208(7), on the other hand, is only part of a single path that took 30 milliseconds, and thus has a distance of 120 milliseconds from the critical path.

One approach for orchestrating edges that are not on the statistical critical path is to sort those edges by average distance from the statistical critical path over multiple executions. Generally, edges that are, on average, closer to the statistical critical path can be preferentially placed in a given process/machine with the edges on the statistical critical path. Likewise, edges further away from the statistical critical path can be preferentially selected for orchestration in a separate process or machine that includes only edges that are not on the statistical critical path. As discussed more below, distance from the statistical critical path can be used in conjunction with other information, such resource utilization, network costs, and serialization costs to orchestrate edges in a manner that tends to reduce or potentially minimize average latency for the application.

Orchestration Based on Expected Runtime Characteristics

Figure 7:
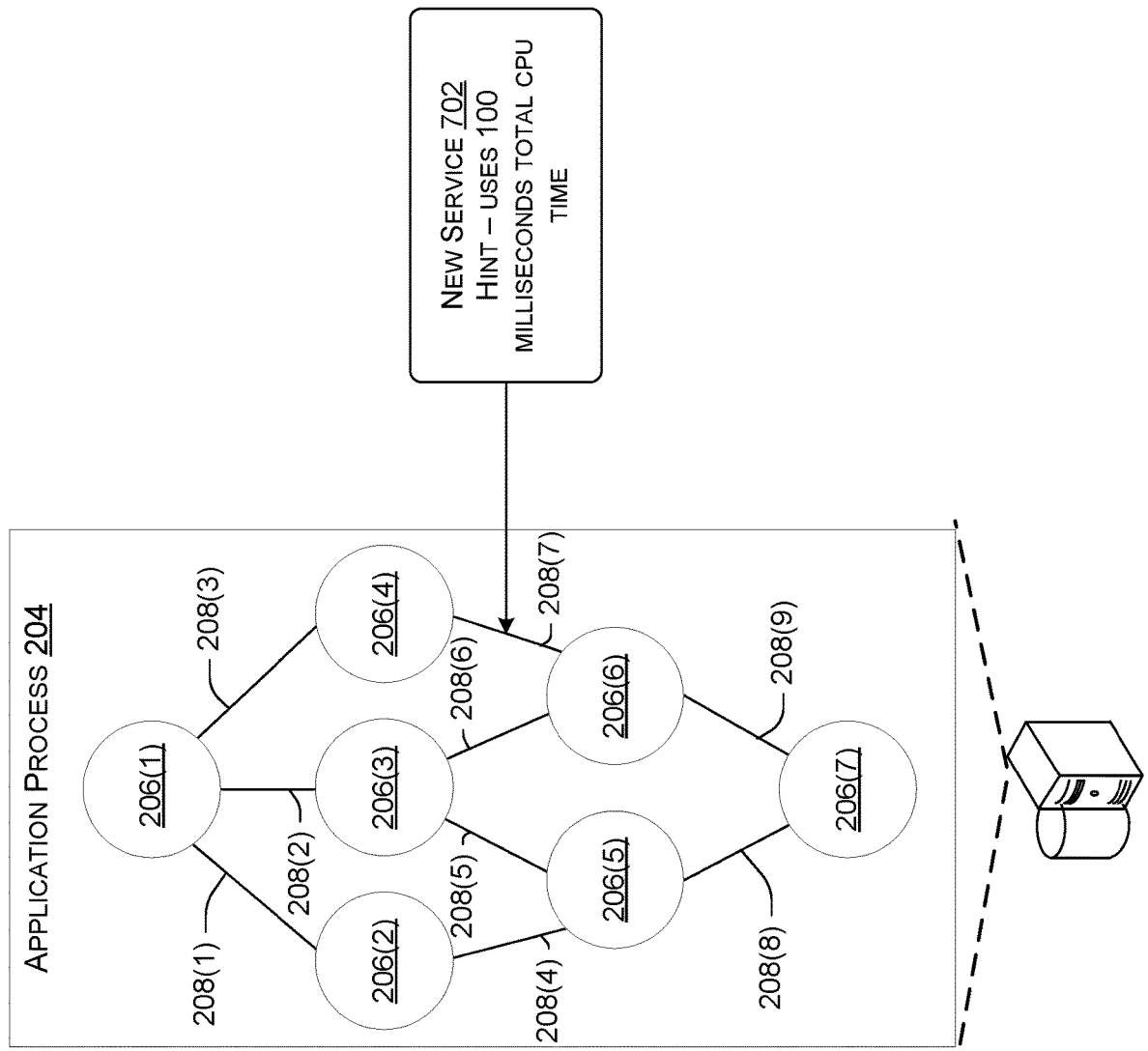
FIG. 7 illustrates an example of a new service being inserted into an application process, consistent with some implementations of the present concepts.

FIG. 7 illustrates another example that may implicate an orchestration change. Here, an existing version of a service corresponding to edge 208(7) is replaced by a new version of the service, e.g., a new service 702. The new service includes a developer hint that it is expected to use a total of 100 milliseconds of CPU time over one or more threads. If this is likely to cause sufficient CPU contention to exceed the network/serialization costs of moving the new service module to another process, the new edge can be orchestrated into a separate process, for reasons discussed above with respect to FIG. 4.

For instance, assume that an older version of edge 208(7) used 50 milliseconds of total CPU time, and each of edges 208(4), 208(5), and 208(6) used 50 milliseconds of total CPU time each. Before the deployment of new service 702, the aggregate CPU time of all of these edges may have been low enough that keeping the edges orchestrated in the same process was preferable to moving one or more edges to a different process. However, since the developer hint conveys that the new service is expected to use 100 milliseconds of total CPU time, the orchestrator can anticipate that CPU contention costs may exceed the additional network and serialization costs of moving one or more edges to a different process. For instance, the orchestrator could proactively orchestrate the new service module into application process 304 on computing cluster 302. Without the developer hint, the orchestrator might have initially orchestrated the new service module in application process 204 and potentially introduced latency issues into the application that would not have been recognized until the next analysis of the execution logs.

Note that developer hints can convey other information, such as anticipated memory usage, storage capacity utilization, storage throughput, network usage, runtimes, serialization costs, etc. In each case, the developer hint can be used as an approximation of actual runtime utilization of these resources for orchestration purposes, as described elsewhere herein. After a new edge has executed for some time, the developer hint may be ignored in favor of using actual runtime characteristics for that edge as obtained from execution logs 114.

Also, note that the developer hint may give information about the expected execution time for that edge. In that case, the expected execution time for the new edge may be substituted for the average execution time of the edge being replaced for the purposes of critical path analysis as described elsewhere herein. For instance, assume that a given edge has a distance of 10 milliseconds from the statistical critical path. If a new version of that edge is received with a developer hint indicating that the new version will average 60 milliseconds of execution time, then this may result in a new statistical critical path that includes that new edge, and the application may be orchestrated accordingly.

Static Vs. Dynamic Orchestration

Generally, the disclosed orchestration techniques can be implemented statically at compile time, or dynamically during run time. For instance, a static approach to moving edge 208(7) is to stop application process 204, compile and link a new executable that lacks edge 208(7), and run this new executable as a new instance of application process 204. Such a static approach could also involve compiling edge 208(7) into a separate executable and running the separate executable in application process 304.

A dynamic approach could involve moving edge 208(7) at runtime. In this approach, application process 204 continues running without being halted, and application process 304 is constructed as described above for static orchestration. In still further implementations (not shown), edge 208(7) can be moved into an existing process that is already running one or more other services without halting the existing process.

Orchestrating an edge from one running process to another running process is generally possible due to the modularized, functional characteristics of services. Because of these characteristics, functional services do not necessarily need to be run in the order defined by the developer in the source code. In other words, the services can be constructed so that, as long as the dependency constraints conveyed by the dependency information are honored, the services can be moved from process to process and/or run in parallel, in anticipation, and independently prioritized as discussed below with respect to scheduling. In a case where an application process is handling multiple executions concurrently (e.g., multiple queries) and a new edge is inserted into the application process, the application process can handle existing executions that have already started with the old version of the edge and handle new executions with the new version of the edge. Once the existing executions have completed, the old version of the edge can be removed from the application process.

Orchestration Considerations

FIGS. 3-7 illustrate a few specific examples of circumstances under which it could be useful to adjust how the application is orchestrated, e.g., by moving edge 208(7) from computing cluster 202 to computing cluster 302. The following description gives some additional details on orchestration approaches. Specifically, the following description relates to how runtime characteristics of an application can be analyzed in view of dependency information for that application to arrive at a relatively efficient orchestration of the application. For instance, an orchestration can be selected based on one or more orchestration objectives. For instance, orchestration objectives can include reducing or minimizing latency, increasing or maximizing reliability, reducing or minimizing financial cost, etc. Note that latency, reliability and cost are just a few examples of orchestration objectives that can be employed.

Generally, orchestration of an application can occur when an application is first deployed, and then the orchestration can subsequently can be modified over time. An application may start as a relatively small collection of services that perform a specific function, such as a search engine that responds to user queries. Over time, developers may refine the application by adding new features via new services, and/or replacing individual services with updated versions, such as a new ranking algorithm for search results.

Each time a new service is deployed, the orchestrator 102 can be run to determine a new orchestration for the application. In addition, the orchestrator can run periodically or constantly to evaluate how the actual runtime characteristics of individual services change over time. Thus, orchestration can continually be modified as an application executes over time and is modified by new services, and/or as runtime characteristics of the individual services are detected over time. Generally, modifying an orchestration can involve selecting a particular service to move from one process to another process, potentially on different machines.

One heuristic approach for orchestration is to start by orchestrating all services into a single process. This is generally a high-performance approach because there is no serialization or network overhead as communications between services can happen within memory allocated to the application process. Once the machine reaches a point where resource contention becomes an issue, alternative orchestrations can be considered.

Generally, there are several sources of information that can be used to detect potential resource contention. As noted, the execution logs 114 can convey information for each edge over many executions of the application, such as the amount of runtime memory, processor utilization, network utilization, number of threads, storage capacity utilization, and/or storage throughput. Alternatively, or in addition, this information can be provided at deployment time via expected runtime characteristics 106 in the form of a developer hint or other representation of how a given service is expected to act at runtime.

Memory generally becomes constrained when the total amount of memory used by the services in the process gets close to exceeding the physical memory available on the machine. Memory can be utilized by executable code, permanent data used by a service (e.g., a dictionary), and also runtime memory that varies during execution (e.g., stack or heap memory). The processor generally becomes constrained when one service is ready to run but is waiting for another service, e.g., because no threads are available. Another example of a resource conflict that can be considered is a cache conflict, where a first service may run slower because the first service has to retrieve data from memory when a second service keeps evicting the first service's data from a processor cache. Network and storage throughput generally become constrained when the bandwidth of the network or storage bus is exceeded by the collective demand imposed by the services within a process. Storage capacity generally becomes constrained when storage drive(s) for a given machine begin to fill up.

Once resource contention is detected, one or more edges can be selected to move to another process. A rules-based or heuristic approach can generally select the edge or edges based on predetermined criteria, some of which are discussed above relative to FIGS. 4-7. For instance, it is generally useful to move edges that have relatively low serialization and network costs, as these factors can contribute greatly to latency. As another criteria, it is generally useful to preferentially move edges that run less frequently instead of edges that run more frequently. As another criteria, it is generally useful to preferentially move edges that are not in the statistical critical path, and that are less likely than other edges to occur in the critical path for a given execution.

Taking the criteria specified above into account, consider a scenario where the application has a service level agreement to respond to 99.9% of queries within 500 milliseconds. The orchestrator 102 can be programmed with a rule that states: when memory utilization exceeds 80%, select the edge that uses the most memory out of the edges that are not in the statistical critical path and move that edge to another process. This can be implemented using the static or dynamic approaches discussed above. A more refined rule might state: when memory utilization exceeds 80%, select the edge that uses the most memory out of the edges that are at least 100 milliseconds from the statistical critical path and have network and serialization costs below 50 milliseconds, and move that edge to another process.

The above rules could be modified similarly for thread utilization, e.g., when the number of threads in a given layer of the dependency graph for an application reaches 95% of the total number of threads, identify the edges that are not in the statistical critical path, sort by the number of threads those edges use, and move the edge that uses the most threads. A more refined rule might state: when the number of threads in a given layer of the execution tree reaches 95% of the total number of threads, identify the edges that are at least 100 milliseconds from the statistical critical path and have network and serialization costs below 50 milliseconds, sort those edges by the number of threads used, and move the edge that uses the most threads.

The above examples illustrate how information such as resource utilization, network and serialization costs, and dependency information can be used to generate rules for orchestrating code. However, in some cases, applications can be very complex with many different services, some of which run on each execution and some of which rarely run. Individual services can range from consistently using the same amount of resources to varying wildly in the amount of resources used at runtime. Likewise, individual services can consistently execute in approximately the same amount of time or can vary wildly in execution times. These factors can be constantly changing in view of how workload changes over time as well as when new services are added to the application.

In addition to the factors outlined above, there may be a very large number of potential orchestrations that are consistent with the dependencies of a given application. Thus, it may be implausible for a heuristic approach to consider all of the potential orchestrations. In addition, there may be instances where optimal or near-optimal orchestrations are not intuitive. For instance, referring back to FIG. 4, a relatively straightforward approach is to move edge 208(7) to another process when memory becomes constrained. However, there may be circumstances when average latency is lower if edge 208(7) is retained and other edges are moved to another process to free memory, and it can be difficult to design a heuristic approach to capture these circumstances.

As an alternative to the heuristic orchestration approaches outlined above, another orchestration approach involves the use of a linear solver or machine-learned model to orchestrate code. Generally, a solver or machine-learned model can use dependency information that indicates ordering constraints for individual services. The dependency information and/or execution logs can also indicate what data is communicated between different services, e.g., the inputs and outputs of each service. By evaluating the size of the data communicated between services, the solver or machine-learned model can infer the serialization and network costs of moving one or more services to another machine.

The solver or machine learning model can orchestrate the code with a given orchestration objective, e.g., to achieve the lowest possible latency given a fixed amount of resources. The solver or machine learning model can consider potential orchestrations of edges on different processes/machines and output a final orchestration given this objective. The solver or machine learning model can also have constraints on the potential orchestrations to avoid exceeding resources available on each machine, e.g., to avoid running out of memory, storage capacity, available threads, etc.

In some implementations, the solver or machine learning model can be programmed to meet a service level agreement (SLA) with a reduced and/or lowest possible financial cost, e.g., using an objective function defined over cost, latency, and/or the reliability required by the SLA. Generally, a solver can consider most or all of the potential orchestrations for an application, evaluate each of the potential orchestrations according to these criteria, and select an optimal or near-optimal orchestration.

In the case of a machine learning model, the previous execution logs can be used as training data. Executions that met the SLA-defined latency can be labeled as positive training examples, and executions that took longer than the SLA-defined latency can be labeled as negative examples. For instance, a neural network could be trained using these training examples. As another example, a reinforcement learning approach could be adopted with a reward function that rewards certain orchestration objectives. In a machine-learning context, the inputs to the orchestrator 102 shown in FIG. 1 can provide features for learning, e.g., the expected runtime characteristics, actual runtime characteristics, and/or dependency information can be used as features.

Over time, as more execution logs are collected, new edges arrive with expected runtime characteristics, and/or dependency information for a given application changes, the solver or machine learning model can adjust how the application is orchestrated. In the case of dynamic orchestration, the orchestrator 102 can continually modify the orchestration of the application by preferentially moving selected edges to different processes to meet the SLA, even while developers continue to independently develop and deploy new services and the application continues running without interruption. As a consequence, not only does the application perform well, but developers can spend their time focused on writing quality services rather than concerning themselves with orchestration concerns.

Orchestration with Dynamic Depencencies

In some implementations, the dependency information for an application can change in mid-execution. For instance, consider an edge that is part of a loop that always runs at least three times, and potentially could run an infinite number of times. At compile time, it may be possible to construct a partial dependency graph for the application with three edges for each of the known loop iterations. At runtime, the partial dependency graph can be completed once the final number of loop iterations is known, e.g., based on a value output by an edge closer to the root node.

In such a case, orchestration can include re-routing services in mid-execution to adapt the application in view of the detected runtime change to the dependency information. For instance, assume that each iteration of the loop uses 1 gigabyte of memory, and that the partial dependency graph includes services that leave 50 gigabytes of memory available. Further assume that, at runtime, a given execution results in a runtime value of a loop counter that will cause the loop to be executed for 100 loop iterations. It follows that, to avoid running out of memory, at least 50 gigabytes of memory need to be freed up. The orchestration approaches discussed in the previous section can be employed in mid-execution to determine that those iterations are performed by instances of those services that are available in another process. In other words, the orchestrator 102 can select, out of the edges that have not yet been run for that execution, which edge or edges should be executed by another process. In some cases, the orchestrator might select the edges that execute the loop iteration in question. However, this is not necessarily the case, as the orchestrator may instead choose a different edge, e.g., if the serialization/network costs of moving the loop iterations exceeds the serialization/network costs of moving one or more other edges that collectively use 50 gigabytes or more of memory, then the orchestrator may select the other edges to reroute to a different process/machine.

Example Scheduling Processing Flow

Figure 8:
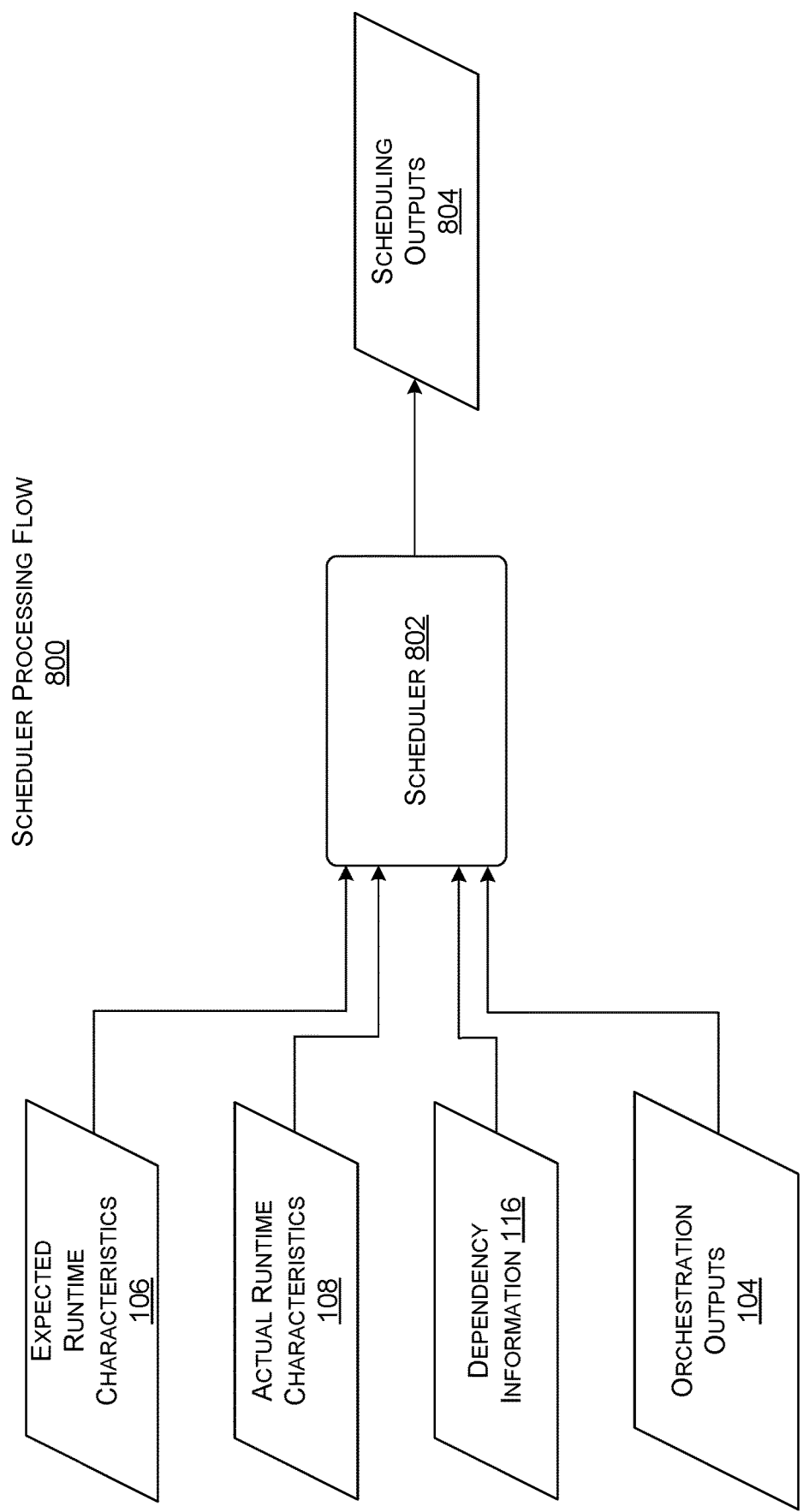
FIG. 8 illustrates an example processing flow for scheduling an application, consistent with some implementations of the present concepts.

As noted previously, scheduling generally refers to determining when code runs, e.g., whether services can be run in anticipation, run in parallel, runtime prioritization of threads for one service relative to another, etc. FIG. 8 illustrates an example scheduler processing flow 800, consistent with the disclosed implementations. In the scheduling processing flow, scheduler 802 generates scheduling outputs 804 based on various inputs. For instance, the scheduling outputs can determine when individual edges are scheduled to run and can also determine the respective scheduling priorities for the thread or threads used to run each edge.

To determine the scheduling outputs 804, the scheduler 802 can consider various sources of input data. For instance, the scheduler can consider expected runtime characteristics 106, actual runtime characteristics 108, dependency information 110, and/or orchestration outputs 104 as discussed previously. The orchestration outputs generally indicate which services will be run together in a given process, e.g., the scheduler operates under the constraint that each service executes in an application process that has been assigned by the orchestrator 102.

The scheduler 802 also operates under the constraint that services are run consistently with the dependency information. For instance, a given edge cannot be run until the input data for that edge is available. However, once the input data for a given edge is available, that edge can be scheduled at any time. Generally, this is plausible due to the previously noted characteristics of services, e.g., they lack complex data dependencies on one another and thus can be scheduled in a flexible manner. This is in contrast to conventional imperative programming, where the source code itself conveys the order in which operations are performed and the developer is responsible for ensuring that complex data dependencies between code modules are handled correctly.

One approach for scheduling code involves generally prioritizing specific services that are closest to the root node of a dependency graph. For instance, the scheduler 802 can sort the edges of a dependency graph by proximity to the root node. For each edge in a given layer, the scheduler can assign the same scheduling priority to each thread that runs that edge, with edges closer to the leaf nodes having lower scheduling priorities. The scheduler can also attempt to run edges closer to the root node sooner if possible, by selected those edges over other edges closer to the leaf nodes to be run in anticipation and/or in parallel provided the input data is available for a given edge. In some cases, the scheduler can even optimistically execute edges that do not necessarily run in every execution of the application. Those optimistic executions can be canceled when a final determination is made that those services will not need be needed, to free up any resources utilized by those optimistic executions.

As noted previously, some implementations may use the execution logs 114 to identify a statistical critical path. Generally, the scheduler 802 can prioritize edges along the statistical critical path higher than edges that are not on the statistical critical path. In other words, the scheduler can preferentially schedule edges on the statistical critical path to run earlier than other edges and/or assign relatively higher scheduling priorities to threads allocated to edges on the statistical critical path than to threads allocated to other edges. Likewise, the scheduler can prioritize the other edges based on their relative distance from the critical path in a similar manner. In some cases, the scheduler can calculate the statistical critical path independently from the inputs shown in FIG. 8. In other implementations, the scheduler can obtain the statistical critical path from the orchestrator 102.

Scheduling Example

Figure 9:
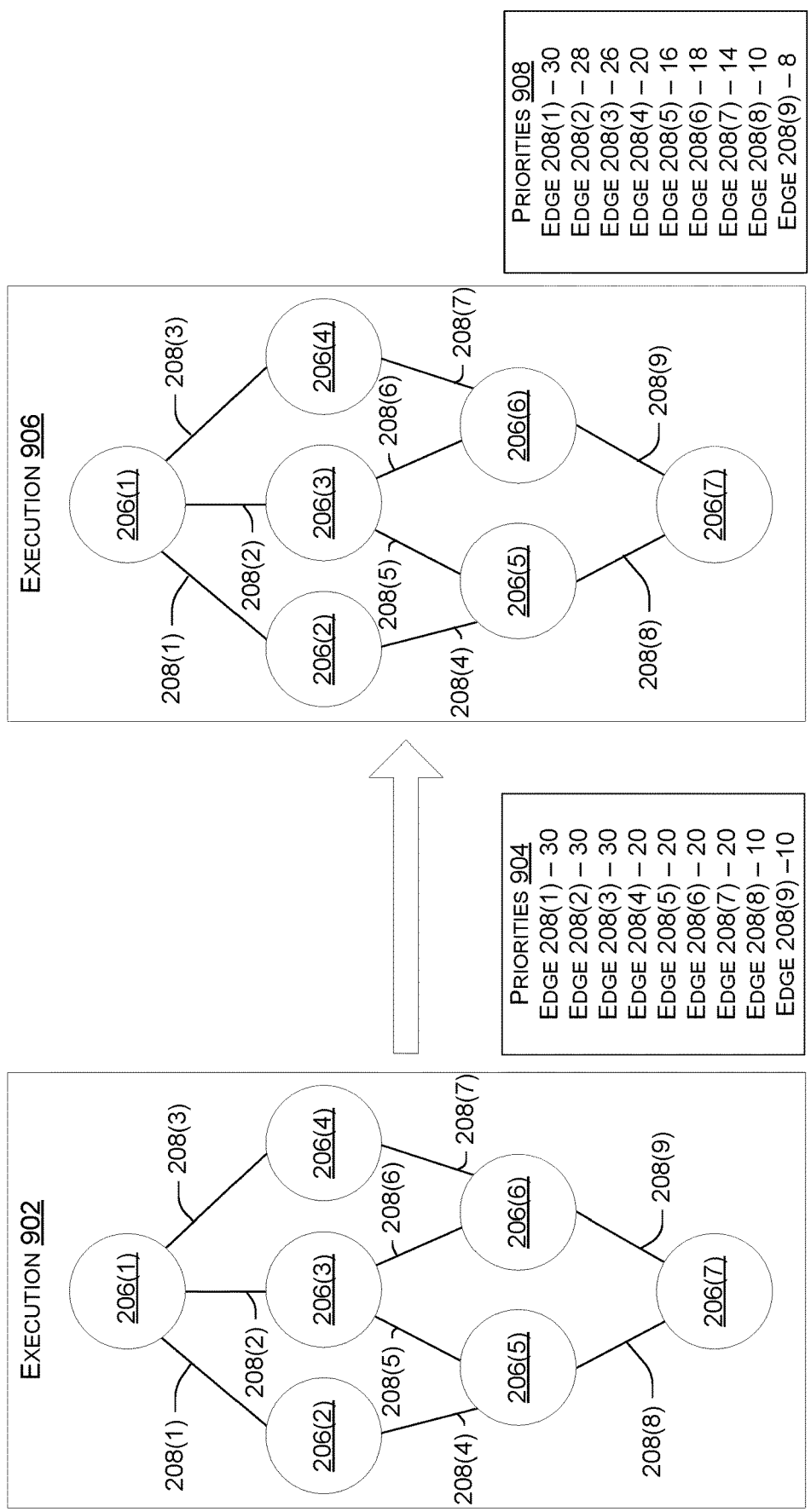
FIG. 9 illustrates example scheduling priorities for different executions of an application, consistent with some implementations of the present concepts.

FIG. 9 illustrates a scheduling example that conveys certain scheduling concepts described above. Assume that for a first execution 902, the scheduler assigns threads for each edge with a corresponding scheduling priority that is based on the distance of that edge from the root node. FIG. 9 includes initial scheduling priorities 904 assigned by the scheduler. Note that the edges in each layer share the same scheduling priorities for their respective threads, and that edges closer to the root node have higher scheduling priorities. This can provide a reasonable first-order scheduling mechanism because latency can typically be reduced if edges closer to the root node are prioritized over edges later in the dependency graph. This is because, as a general rule, edges closer to the root node have more edges that depend directly or indirectly on the output of that edge.

However, the above approach can generally be extended by considering which edges are actually likely to be in the statistical critical path. Refer back to the example shown in FIG. 6, where the critical path is shown in bold for three different executions of the application. In this case, edges 208(1), 208(4), and 208(8) appear in the critical path ⅔ of the time, and thus are in the statistical critical path. Edges 208(2), 208(6), and 208(9) appear in the critical path once. One potential scheduling approach is to prioritize scheduling of edges first by layer and then by likelihood of appearing in the critical path. This approach is shown for execution 906 in FIG. 9 via priorities 908. Within each layer, edges that appear more frequently in the critical path have higher scheduling priorities than other edges in those layers.

Another approach is to schedule edges first by layer and then by average distance from the statistical critical path. This is a similar approach that, in some cases, yields different results. Consider a first edge that appears three times in the critical path over 10,000 executions. For instance, the first edge might have an average duration of 10 milliseconds but may have taken much longer, e.g., 100 milliseconds, on the three executions in which the first edge appeared in the critical path. Consider a second edge in the same layer as the first edge that has an average duration of 15 milliseconds but does not once appear in the critical path over 10,000 executions. In an implementation where edges are prioritized by distance from the statistical critical path, it is plausible that the second edge may be prioritized higher than the first edge. In an implementation where edges are prioritized based on how frequently the edges appear in the critical path over multiple executions, the first edge will be prioritized over the second edge.

In addition, note that the previous example assumes that each edge in a given layer has a lower priority than any edge in a layer that is closer to the root. This is one plausible implementation but is not intended to imply any limitation. For instance, referring back to FIG. 6, other implementations might give edge 208(8) a higher priority than edge 208(3), as edge 208(3) never appears in the critical path over the three illustrated executions.

In addition, note that the description above with respect to FIG. 9 used scheduling priorities for an example of prioritized scheduling. However, a similar approach can be adopted for determining when to schedule a given edge. For instance, assuming that input data is available for multiple different edges, the scheduler can preferentially schedule any of those edges that are on the statistical critical path to run before scheduling other edges that are not on the statistical critical path. Likewise, of the remaining edges for which input data is ready and are not on the statistical critical path, the scheduler can preferentially schedule those edges in order based on either the frequency within which those edges have appeared in the critical path for individual executions, and/or the respective distances of those edges from the statistical critical path.

Furthermore, scheduling can also consider expected runtime characteristics 106 and/or actual runtime characteristics 108. For instance, as noted above, the expected runtime characteristics for a new edge can be used to calculate a new statistical critical path for a given application. In addition, scheduler 802 can generally try to avoid scheduling edges to run concurrently on the same machine when the resource utilization characteristics of those edges are likely to cause a resource conflict as discussed above with respect to orchestration.

In some cases, the scheduler 802 might adjust scheduling of a given edge when a new service is received with a developer hint that indicates that service will have a resource conflict that was not present with a previous version of that service. In other cases, the scheduler might detect resource contention after running a new service for a certain amount of time and adjust how that service is scheduled accordingly. As noted previously, services can generally be scheduled whenever input data is available provided the dependencies for the application are honored. Thus, if the scheduler determines that running a particular group of edges together will likely create a resource conflict, the scheduler can preferentially run one or more of those edges when input data becomes available over other edges that may not be involved in a resource conflict. For instance, the scheduler may preferentially schedule edges so that they complete and cease utilizing a given resource before other edges that use that same resource heavily are scheduled to run.

Example System

Figure 10:
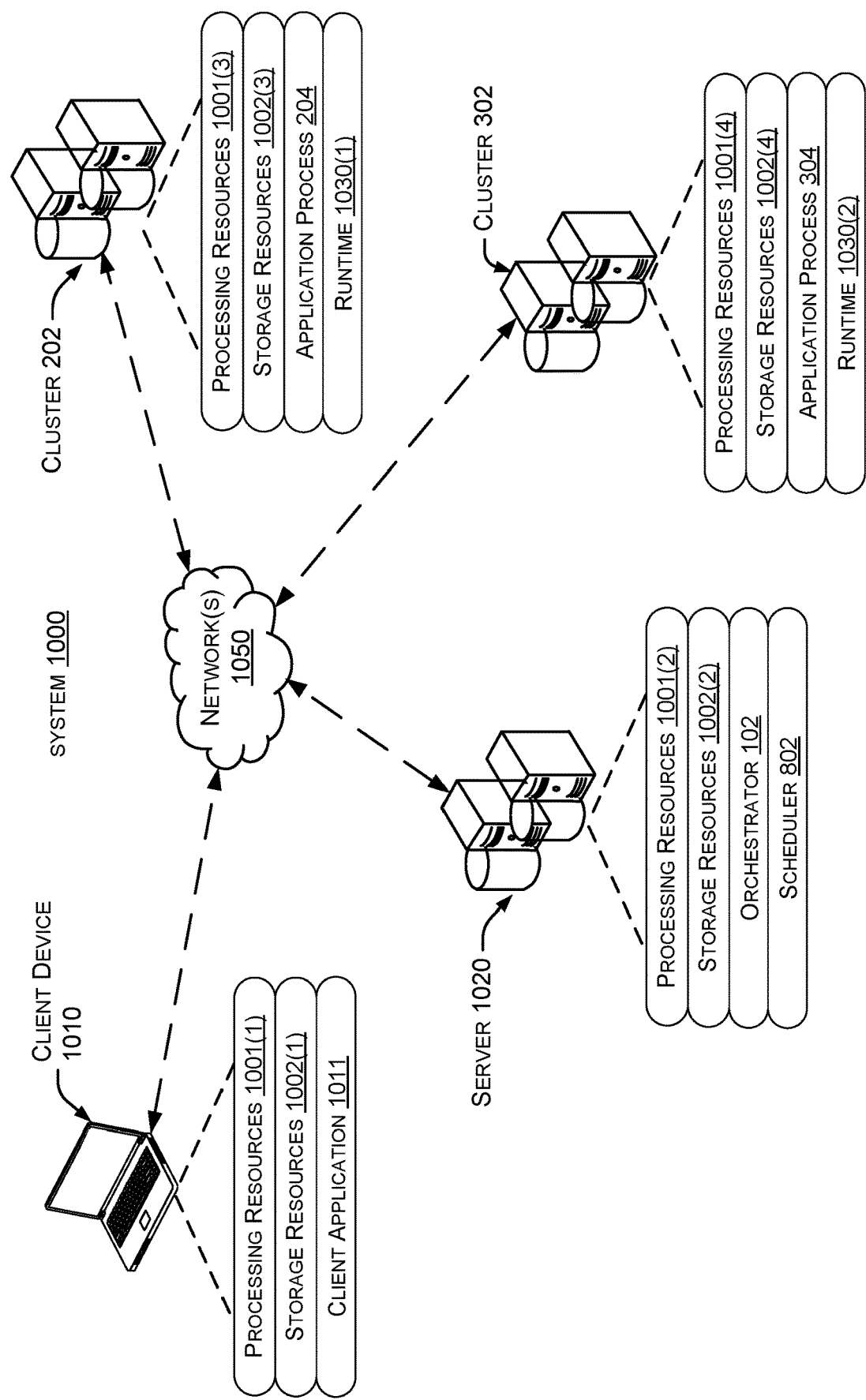
FIG. 10 illustrates an example system, consistent with some implementations of the present concepts.

The present implementations can be performed in various scenarios on various devices. FIG. 10 shows an example system 1000 in which the present implementations can be employed, as discussed more below. As shown in FIG. 10, system 1000 includes a client device 1010, server 1020, computing cluster 202, and computing cluster 302 connected by one or more network(s) 1050. Note that the client devices can be embodied both as mobile devices such as smart phones and tablets, as well as stationary devices such as desktops. Likewise, the servers and/or clusters can be implemented using various types of computing devices. In some cases, any of the devices shown in FIG. 10, but particularly server 1020 and computing clusters 202 and 203, can be implemented in data centers, server farms, etc.

Certain components of the devices shown in FIG. 10 may be referred to herein by parenthetical reference numbers. For the purposes of the following description, the parenthetical (1) indicates an occurrence of a given component on client device 1010, (2) indicates an occurrence of a given component on server 1020, (3) indicates an occurrence on computing cluster 202, and (4) indicates an occurrence on computing cluster 302. Unless identifying a specific instance of a given component, this document will refer generally to the components without the parenthetical.

Generally, the devices shown in FIG. 10 may have respective processing resources 1001 and storage resources 1002, which are discussed in more detail below. The devices may also have various modules that function using the processing and storage resources to perform the techniques discussed herein. For example, client device 1010 can include a client application 1011 that can interact with either application process 204 on computing cluster 202 and/or application process 304 on computing cluster 302. For instance, the client device can submit queries to the application processes, and receive responses from the application processes, over network 1050.

Orchestrator 102 can perform orchestration processing flow 100 as shown in FIG. 1. Scheduler 802 can perform scheduler processing flow 802 as shown in FIG. 8. The respective orchestration and scheduling outputs can be provided to runtime 1030(1) on computing cluster 202 and runtime 1030(2) on computing cluster 302. The runtime can be responsible for swapping in new services as they are received and generating execution logs 114 and providing the execution logs to the orchestrator and/or scheduler.

Example Orchestration Method

Figure 11:
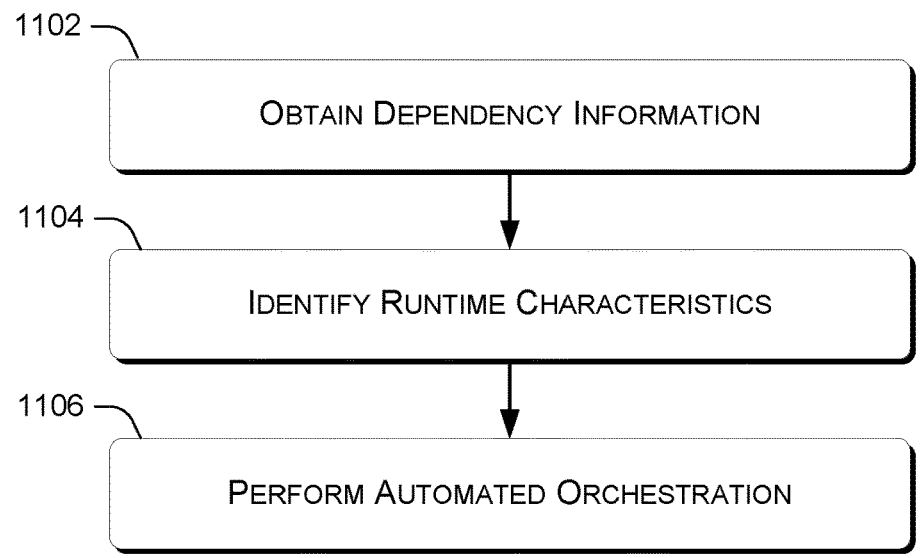
FIG. 11 illustrates an example method or technique for orchestrating an application, consistent with some implementations of the present concepts.

FIG. 11 illustrates an example orchestration method 1100 that can be used to orchestrate services of an application into one or more processes on one or more machines, consistent with the present concepts. Method 1100 can be implemented on many different types of devices, e.g., by one or more cloud servers, by a client device such as a laptop, tablet, or smartphone, or by combinations of one or more servers, client devices, etc. In some implementations, method 1100 is performed by orchestrator 102.

Method 1100 begins at block 1102, where dependency information for an application is obtained. As noted previously, the dependency information can be in the form of a dependency graph that conveys data dependencies between individual services of the application. In some cases, the dependency information is generated at compile time and does not change at runtime. In other cases, dependency information is generated entirely at runtime. In still other cases, initial dependency information is generated at compile time and then modified at runtime.

Method 1100 continues at block 1104, where runtime characteristics of the individual services are identified. As previously noted, in some cases, the runtime characteristics are actual runtime values based on previous executions of the applications. In other cases, the runtime characteristics are expected runtime characteristics provided by a developer.

Method 1100 continues at block 1106, where automated orchestration is performed. For instance, block 1106 can involve performing orchestration processing flow 100.

Example Scheduling Method

Figure 12:
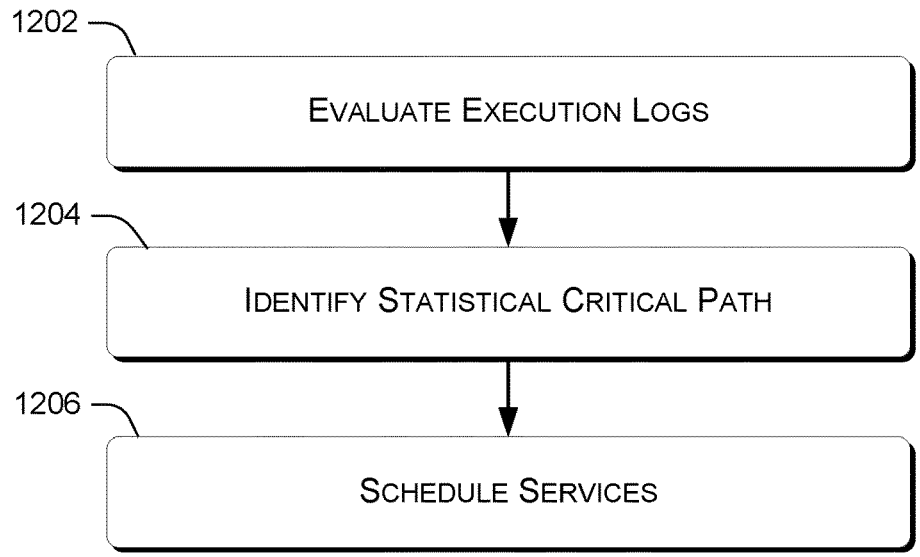
FIG. 12 illustrates an example method or technique for scheduling an application, consistent with some implementations of the present concepts.

FIG. 12 illustrates an example scheduling method 1200 that can be used to schedule services of an application, consistent with the present concepts. As discussed more below, method 1200 can be implemented on many different types of devices, e.g., by one or more cloud servers, by a client device such as a laptop, tablet, or smartphone, or by combinations of one or more servers, client devices, etc. In some implementations, method 1200 is performed by orchestrator 102.

Method 1200 begins at block 1202, where execution logs are evaluated to identify different critical paths. As previously noted, each time an application is executed, a corresponding critical path can be determined. As noted with respect to FIG. 6, different executions of an application can result in different critical paths.

Method 1200 continues at block 1204, where a statistical critical path is identified. Generally, the statistical critical path is a particular path through the services of the application that tends to be the critical path relatively frequently over multiple executions of the application. In some cases, the statistical critical path is the critical path that appears most frequently out of the critical paths identified at block 1202.

Method 1200 continues at block 1206, where services are scheduled based on whether the services occur on the statistical critical path. For instance, services on the statistical critical path may be preferentially prioritized over services that are not on the statistical critical path. More generally, block 1206 can involve performing scheduler processing flow 800.

Device Implementations

As noted above with respect to FIG. 10, system 1000 includes several devices, including a client device 1010, a server 1020, and individual servers in computing clusters 202 and 302. As also noted, not all device implementations can be illustrated, and other device implementations should be apparent to the skilled artisan from the description above and below. For instance, in some implementations, orchestration and/or scheduling can be performed directly on computing device that executes an application process, rather than in a separate device as illustrated.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage resources. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. In some cases, the modules of system 1000 are provided as executable instructions that are stored on persistent storage devices, loaded into the random-access memory devices, and read from the random-access memory by the processing resources for execution.

As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor,"

"hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 1050. Without limitation, network(s) 1050 can include one or more local area networks (LANs), wide area networks (WANs), the Internet, and the like.

In addition, some implementations may employ any of the disclosed techniques in an Internet of Things (IoT) context. In such implementations, a home appliance or automobile might provide computational resources that implement the modules of system 1000.

Additional Examples

Various device examples are described above. Additional examples are described below. One example includes a method performed by a computing device, the method comprising obtaining dependency information for an application, the dependency information representing data dependencies between a plurality of services of the application, identifying runtime characteristics of individual services, and based at least on the dependency information and the runtime characteristics, performing automated orchestration of the individual services into one or more application processes.

Another example can include any of the above and/or below examples where the identifying comprises deriving actual runtime characteristics of the individual services from execution logs reflecting previous executions of the application.

Another example can include any of the above and/or below examples where for each individual service, deriving, from the execution logs, at least the following actual runtime characteristics: memory utilization, thread utilization, network utilization, storage throughput, storage capacity utilization, serialization costs, runtime duration, and network costs.

Another example can include any of the above and/or below examples where the performing automated orchestration comprises orchestrating the plurality of services based at least one or more orchestration objectives selected from a group comprising latency, financial cost, and reliability.

Another example can include any of the above and/or below examples where the performing automated orchestration comprises selecting a particular service to move from a first application process to a second application process based at least on how frequently the particular service is executed over multiple previous executions of the application.

Another example can include any of the above and/or below examples where the performing automated orchestration comprises selecting a particular service to move from a first application process to a second application process based at least on whether the particular service appears in a critical path of the application over multiple previous executions of the application.

Another example can include any of the above and/or below examples where the automated orchestration is performed dynamically without halting the one or more application processes.

Another example can include any of the above and/or below examples where the identifying comprises receiving a developer hint that conveys an expected runtime characteristic of a new version of a particular service.

Another example can include any of the above and/or below examples where the performing automated orchestration comprises removing an existing version of the particular service and performing automated orchestration of the new version of the particular service into a selected process based at least on the expected runtime characteristic conveyed by the developer hint.

Another example can include a method performed on a computing device, the method comprising evaluating execution logs for an application having a plurality of services to identify different critical paths corresponding to multiple executions of the application, identifying a statistical critical path for the application based at least on frequency of occurrence of the different critical paths in the execution logs, and scheduling individual services of the application based at least on whether the individual services occur on the statistical critical path.

Another example can include any of the above and/or below examples where the scheduling comprises assigning scheduling priorities to threads allocated to the individual services.

Another example can include any of the above and/or below examples where wherein the scheduling comprises prioritizing specific services that occur on the statistical critical path above one or more other services that do not occur on the statistical critical path.

Another example can include any of the above and/or below examples where the method further comprises determining respective distances of the one or more other services from the statistical critical path and prioritizing the one or more other services based at least on the respective distances of the one or more other services from the statistical critical path.

Another example can include any of the above and/or below examples where determining the respective distances of the one or more other services from the statistical critical path comprises, based at least on previous execution times of the one or more other services, determining the respective distances as respective amounts of time that the one or more other services would have had to run before appearing in the statistical critical path.

Another example can include any of the above and/or below examples where the statistical critical path comprises a particular path through the application that, over the multiple executions, most frequently determines latency of the application.

Another example can include a system comprising a first computing cluster configured to execute a first application process, a second computing cluster configured to execute a second application process, and a computing device configured to execute an orchestrator configured to: obtain dependency information reflecting dependencies between a plurality of services of an application, obtain runtime information representing runtime characteristics of individual services, and based at least on the dependency information and the runtime characteristics, perform orchestration of the individual services into the first application process on the first computing cluster and the second application process on the second computing cluster.

Another example can include any of the above and/or below examples where the orchestrator comprises a solver or a machine-learned model.

Another example can include any of the above and/or below examples where the solver or the machine-learned model can be configured to perform the orchestration based at least on a latency objective for the application.

Another example can include any of the above and/or below examples where the orchestrator can be configured to detect a runtime change to the dependency information and modify the orchestration during execution of the application based at least on the runtime change to the dependency information.

Another example can include any of the above and/or below examples where the runtime change comprising a change to a runtime value for a number of loop iterations.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method comprising:
obtaining dependency information for an application, the dependency information representing data dependencies between a plurality of services of the application;
identifying actual runtime characteristics of individual services of the plurality of services of the application based at least on an execution log reflecting previous executions of the application when the plurality of services ran in a first application process on a first computing device;
identifying, based at least on the dependency information, preceding services of the plurality of services that provide input data to the individual services and subsequent services of the plurality of services that depend on output data of the individual services;
based at least on the actual runtime characteristics, determining at least one of serialization costs of removing the individual services from the first application process or network costs of removing the individual services from the first application process, the serialization costs including input data serialization costs of serializing the input data from the preceding services and output data serialization costs of serializing the output data for the subsequent services, the network costs including input data network costs of sending the input data from the preceding services over a network from the first computing device to a second computing device and output data network costs of sending the output data for the subsequent services over the network from the second computing device to the first computing device;
based at least on the actual runtime characteristics, determining benefits of freeing computing resources on the first computing device by removing the individual services from the first application process; and
based at least on the benefits of freeing the computing resources and the at least one of the serialization costs or the network costs, performing automated orchestration of the application by selecting a particular service from the plurality of services and moving the particular service from the first application process on the first computing device into a second application process on the second computing device while continuing to execute other services of the application in the first application process on the first computing device.

2. The method of claim 1, wherein the automated orchestration is performed based at least on the serialization costs.

3. The method of claim 2, further comprising:
for each individual service, deriving, from the execution log, at least the following actual runtime characteristics:
memory utilization,
thread utilization,
network utilization,
storage throughput,
storage capacity utilization,
the serialization costs,
runtime duration, and
the network costs.

4. The method of claim 1, wherein the performing automated orchestration comprises:
orchestrating the plurality of services based at least on one or more orchestration objectives selected from a group comprising latency, financial cost, and reliability.

5. The method of claim 1, wherein the performing automated orchestration comprises:
selecting the particular service to move from the first application process to the second application process based at least on how frequently the particular service is executed over multiple previous executions of the application.

6. The method of claim 1, wherein the performing automated orchestration comprises:
selecting the particular service to move from the first application process to the second application process based at least on whether the particular service appears in a critical path of the application over multiple previous executions of the application.

7. The method of claim 1, wherein the automated orchestration is performed dynamically without halting the first application process.

8. The method of claim 1, wherein the identifying comprises:
receiving a developer hint that conveys an expected runtime characteristic of a new version of the particular service.

9. The method of claim 8, wherein the performing automated orchestration comprises:
removing an existing version of the particular service and performing automated orchestration of the new version of the particular service into a selected process based at least on the expected runtime characteristic conveyed by the developer hint.

10. The method of claim 1, wherein the automated orchestration is performed based at least on the network costs.

11. The method of claim 1, wherein the benefits employed to perform the automated orchestration include an amount of memory freed on the first computing device.

12. The method of claim 1, wherein the benefits employed to perform the automated orchestration include reduced processor cache utilization on the first computing device.

13. The method of claim 1, wherein the benefits employed to perform the automated orchestration include reduced storage utilization on the first computing device.

14. The method of claim 1, performed by a third computing device other than the first computing device and the second computing device.

15. A system comprising:
a first computing cluster include a least one first processor configured to execute a first application process;
a second computing cluster include a least one second processor configured to execute a second application process; and
a computing device include at least one third processor configured to perform orchestration of a plurality of services of an application on the first computing cluster and the second computing cluster by:
obtaining dependency information reflecting dependencies between the plurality of services of the application;
identifying, based at least on the dependency information, preceding services of the plurality of services that provide input data to individual services and subsequent services of the plurality of services that depend on output data of the individual services;
obtaining runtime information representing actual runtime characteristics of the individual services based at least on an execution log reflecting previous executions of the application when the plurality of services ran in the first application process on the first computing cluster;
based at least on the actual runtime characteristics, determining at least one of serialization costs of removing the individual services from the first application process or network costs of removing the individual services from the first application process, the serialization costs including input data serialization costs of serializing the input data from the preceding services and output data serialization costs of serializing the output data for the subsequent services, the network costs including input data network costs of sending the input data from the preceding services over a network from the first computing cluster to the second computing cluster and output data network costs of sending the output data for the subsequent services over the network from the second computing cluster to the first computing cluster;
based at least on the actual runtime characteristics, determining benefits of freeing computing resources on the first computing cluster by removing the individual services from the first application process; and
based at least on the benefits of freeing the computing resources and the at least one of the serialization costs or the network costs, orchestrating the individual services by selecting a particular service of the plurality that previously executed in the first application process with other services of the application on the first computing cluster and moving the particular service into the second application process on the second computing cluster while continuing to execute the other services of the application in the first application process on the first computing cluster.

16. The system of claim 15, the computing device configured to employ a solver or a machine-learned model to perform the orchestration.

17. The system of claim 16, the solver or the machine-learned model executed by the at least one third processor being configured to perform the orchestration based at least on a latency objective for the application.

18. The system of claim 15, the computing device being configured to:
detect a runtime change to the dependency information; and
modify the orchestration during execution of the application based at least on the runtime change to the dependency information.

19. The system of claim 18, the runtime change comprising a change to a runtime value for a number of loop iterations.

20. A computer-readable storage media storing executable instructions which, when executed by a processing unit, cause the processing unit to perform acts comprising:
obtaining dependency information for an application, the dependency information representing data dependencies between a plurality of services of the application;
identifying actual runtime characteristics of individual services of the plurality of services of the application based at least on an execution log reflecting previous executions of the application when the plurality of services ran in a first application process on a first computing device; identifying, based at least on the dependency information, preceding services of the plurality of services that provide input data to the individual services and subsequent services of the plurality of services that depend on output data of the individual services;
based at least on the actual runtime characteristics, determining at least one of serialization costs of removing the individual services from the first application process or network costs of removing the individual services from the first application process, the serialization costs including input data serialization costs of serializing the input data from the preceding services and output data serialization costs of serializing the output data for the subsequent services, the network costs including input data network costs of sending the input data from the preceding services over a network from the first computing device to a second computing device and output data network costs of sending the output data for the subsequent services over the network from the second computing device to the first computing device;

based at least on the actual runtime characteristics, determining benefits of freeing computing resources on the first computing device by removing the individual services from the first application process; and based at least on the benefits of freeing the computing resources and the at least one of the serialization costs or the network costs, performing automated orchestration of the application by selecting a particular service from the plurality of services and moving the particular service from the first application process on the first computing device into the a second application process on the second computing device while continuing to execute other services of the application in the first application process on the first computing device.

21. The computer-readable storage media of claim 20, wherein both the serialization costs and the network costs are employed when performing the automated orchestration.

22. The computer-readable storage media of claim 20, wherein the automatic orchestration considers whether the individual services are on a statistical critical path of the application.

23. The computer-readable storage media of claim 22, wherein the execution log identifies at least one additional critical path other than the statistical critical path and the statistical critical path occurs more frequently in the execution log than the at least one additional critical path.

24. The computer-readable storage media of claim 20, wherein the automatic orchestration considers distances of the individual services from a statistical critical path of the application.

\* \* \* \* \*